United States Patent
Fabre et al.

(10) Patent No.: US 10,763,007 B2
(45) Date of Patent: Sep. 1, 2020

(54) METHODS FOR DIELECTRICALLY INSULATING ELECTRICAL ACTIVE PARTS

(71) Applicant: SOLVAY SA, Brussels (BE)

(72) Inventors: Jean Fabre, Wettbergen (DE); Ferdinand Hardinghaus, Bad Honnef (DE); Holger Pernice, Schwanewede (DE)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 15/781,266

(22) PCT Filed: Dec. 2, 2016

(86) PCT No.: PCT/EP2016/079619
§ 371 (c)(1),
(2) Date: Jun. 4, 2018

(87) PCT Pub. No.: WO2017/093499
PCT Pub. Date: Jun. 8, 2017

(65) Prior Publication Data
US 2018/0322981 A1 Nov. 8, 2018

(30) Foreign Application Priority Data
Dec. 4, 2015 (EP) ................................. 15197933

(51) Int. Cl.
*H01B 3/22* (2006.01)
*H01B 3/56* (2006.01)
*H02B 13/055* (2006.01)

(52) U.S. Cl.
CPC ............... *H01B 3/56* (2013.01); *H01B 3/22* (2013.01); *H02B 13/055* (2013.01)

(58) Field of Classification Search
CPC .......... H01B 3/22; H01B 3/56; H01B 13/055; H02B 1/26; H02B 13/055
See application file for complete search history.

(56) References Cited

U.S. PATENT DOCUMENTS

| | | |
|---|---|---|
| 4,565,901 A | 1/1986 | Hirooka et al. |
| 2015/0083979 A1 | 3/2015 | Costello et al. |
| 2018/0082763 A1 | 3/2018 | Pernice et al. |
| 2018/0108451 A1 | 4/2018 | Janssen et al. |
| 2018/0108452 A1 | 4/2018 | Pernice et al. |

FOREIGN PATENT DOCUMENTS

| | | | |
|---|---|---|---|
| WO | 1998023363 A1 | 6/1998 | |
| WO | 2014096414 A1 | 6/2014 | |
| WO | 2014/187940 A1 | 11/2014 | |
| WO | 2015/071303 A1 | 5/2015 | |
| WO | WO-2015071303 A1 * | 5/2015 | .......... H02B 13/055 |
| WO | 2017/093501 A1 | 6/2017 | |
| WO | 2017/093503 A1 | 6/2017 | |
| WO | 2017/093504 A1 | 6/2017 | |
| WO | 2017/093510 A1 | 6/2017 | |

OTHER PUBLICATIONS

U.S. Appl. No. 15/564,842, filed Oct. 6, 2017.
U.S. Appl. No. 15/564,849, filed Oct. 6, 2017.
U.S. Appl. No. 15/564,853, filed Oct. 6, 2017.
U.S. Appl. No. 15/781,272, filed Jun. 4, 2018.
U.S. Appl. No. 15/781,278, filed Jun. 4, 2018.
U.S. Appl. No. 15/781,284, filed Jun. 4, 2018.
U.S. Appl. No. 15/781,293, filed Jun. 4, 2018.
A.V. Fokin, et al., "Some Reactions of Chlorine and Iodine Luorosulfates", Journal of Fluorine Chemistry, vol. 18, 1981, pp. 553-572.
Database CA [Online] Chemical Abstracts Service, Columbus, Ohio, US, Jan. 1, 1965, Gubanov, V.A. et al., "Some Reactions of Perfluoromethyl 3,3-dihydroperfluoroallyl ether", XP-002757543, 2 pages.

* cited by examiner

*Primary Examiner* — Bijan Ahvazi

(57) ABSTRACT

Methods for dielectrically insulating electrical active parts The invention concerns methods for dielectrically insulating electrical active parts using certain fluorinated cyano-substituted ethers as well as compositions and apparatus comprising such compounds.

13 Claims, No Drawings

METHODS FOR DIELECTRICALLY INSULATING ELECTRICAL ACTIVE PARTS

This application is a U.S. national stage entry under 35 U.S.C. § 371 of International Application No. PCT/EP2016/079619, filed Dec. 2, 2016, which claims priority to European application No. 15197933.3 filed on. The entire contents of these applications are explicitly incorporated herein by this reference.

This application claims priority to European application No. 15197933.3 filed on the 4 Dec. 2015, the whole content of this application being incorporated herein by reference for all purposes.

The invention concerns methods for dielectrically insulating electrical active parts using certain fluorinated cyano-substituted ethers as well as compositions and apparatus comprising such compounds.

Dielectrically insulation media in liquid or gaseous state are applied for the insulation of electrical active parts in a wide variety of electrical apparatus, e.g. in switchgears or transformers.

Mixtures of $SF_6$ and $N_2$ are widely applied as dielectrically insulating medium. Efforts have been made in the past to provide alternative dielectrically insulating media.

WO 2014/096414 concerns a method of dielectrically insulating electrical active parts using certain fluorinated compounds, e.g. fluorinated ethers and peroxides.

The object of the present invention is to provide improved methods and/or compositions for the electrical insulation of electrical active parts.

Advantageously, the methods and compositions of the present invention show improved insulation, arc-extinguishing and/or switching performance. Also advantageously, the methods and compositions of the present invention show advantageous environmental impact when the insulating medium is released into the atmosphere, e.g. as measured by an improved global warming potential (GWP) and/or improved ozone depletion. Also advantageously, the methods and compositions of the present invention show an improved toxicological behavior, as measured for example by a higher LC50 and/or a higher Occupational Exposure Limit. Furthermore, the methods and compositions advantageously show an improved dew point, vapour pressure, boiling point, dielectrical strengths, and/or thermal stability of the insulating media. Additionally, the compositions according to this invention advantageously show an improved chemical inertness against the construction materials used e.g. for the electrical active parts and/or improved heat transfer properties.

These and other objectives are solved by the present invention as outlined in the claims.

Accordingly, a first aspect of the present invention concerns a method for dielectrically insulating an electrical active part wherein the electrical active part is arranged in a gas-tight housing comprising an insulating medium consisting of, consisting essentially of, or comprising a compound of general formula (I): $NC-C_nH_mF_{(2n)-m}-O-C_{n'}H_{m'}F_{(2n'+1)-m'}$ where n is 1, 2, 3, 4, or 5 and m is integer between 0 and 2n and wherein n' is 1, 2, 3, 4, or 5 and m' is integer between 0 and 2n'.

Thus, the compounds according to the general formula above contain an ether function (—O—) and a nitrile function (CN or NC, which are connected by a triple bond)

The term "consisting essentially of" as used herein is intended to denote a composition comprising the components as specified as well as other components in trace amounts wherein the presence of the other components does not change the essential characteristics of the specified subject matter.

Preferably, the compounds according to the invention are perfluorinated, i.e. m and m' are 0. Hence, all hydrogen atoms are replaced by fluorine atoms.

Also preferably, n is 1, i.e. the alkenyl function $C_nH_mF_{(2n)-m}$ between the ether bridge and the nitrile functionality consists of 1 carbon atom. More preferably, the alkenyl function is $-CF_2-$.

Also preferably, n' is 1, i.e. the alkyl function $C_{n'}H_{m'}F_{(2n'+1)-m'}$ consists of one carbon, i.e. preferably the alkyl function is a fluorinated methyl group, more specifically $CF_3$.

In a preferred embodiment, n and n' are the same. In an alternative preferred embodiment, n and n' are different.

In a preferred embodiment, m and m' are the same. In an alternative preferred embodiment, m and m' are different.

Most preferably, the compound of general formula (I) is $CF_3-O-CF_2-CN$.

In the frame of the present invention, the singular is intended to include the plural, and vice versa.

Compounds of general formula (I) can be prepared by methods known in the prior art. For example, Gubanov, V. A. et al., Zhurnal Obshchei Khimii, 1965, Vol. 35, No. 4, pp. 754-755, describes the synthesis of $CF_3-O-CF_2-CN$ from the corresponding ester $CF_3-O-CF_2-C(O)OCH_3$ by reacting the latter with $NH_3$ and in a second step with $P_2O_5$. The fluorinated esters are available commercially or can be prepared by methods known in the prior art.

Alternatively, the corresponding esters $RO(O)C-C_nH_mF_{(2n)-m}-O-C_{n'}H_{m'}F_{(2n'+1)-m'}$ can be prepared by a reaction of $RO(O)C-C_nH_mF_{(2n)-m}-Cl$ with $C_{n'}H_{m'}F_{(2n'+1)-m'}O^-K^+$, wherein n, n', m, m' are as defined for the compounds of general formula (I) and R is intended to denote an alkyl group, preferably methyl or ethyl. For example, $CF_3-O-CF_2-C(O)OMe$ can be prepared by a reaction of $CF_3O^-K^-$ with $F_2ClCC(O)OC_2H_5$. The chloro-fluoro-substituted esters can be obtained commercially.

Furthermore, compounds of general formula (I) can be prepared by reaction of the ethers $HC_nH_mF_{(2n)-m}-O-C_{n'}H_{m'}F_{(2n'+1)-m'}$ with chlorine under and further reacting the intermediate $ClC_nH_mF_{(2n)-m}-O-C_{n'}H_{m'}F_{(2n'+1)-m'}$ with an a cyanate salt, preferably a cyanate salt of an alkali metal, e.g. $K^+CN^-$. Thus, $CF_3-O-CF_2-CN$ can be prepared by reaction of $CF_3OCF_2H$ with $Cl_2$ under radical conditions, e.g. in presence of a radical starter and/or UV light, and subsequent reaction of the $CF_3OCF_2Cl$ formed in the first step with $K^+CN^-$.

Preferably, the insulating medium used in the inventive method comprises the compound of formula (I) and at least one further compound selected from the list consisting of an inert gas, a perfluorinated or partially fluorinated ketone, a perfluorinated or partially fluorinated ether, a perfluorinated or partially fluorinated ester, a perfluorinated or partially fluorinated cyano compound and a hydrocarbon compound. More preferably, the at least one compound is an inert gas selected from the group consisting of air, synthetic air, an air component, $N_2$, $O_2$, $CO_2$, $N_2O$, He, Ne, Ar, Xe and $SF_6$; preferably the at least one compound is $N_2$.

The term "inert gas" is intended to denote a gas that does not react with the compounds according to the invention. Preferably, the inert gas is chosen from the list consisting of air, synthetic air, an air component, $N_2$, $O_2$, $CO_2$, $N_2O$, He, Ne, Ar, Xe or $SF_6$; more preferably, the inert gas is $N_2$.

Preferably, the at least one compound is a perfluorinated or partially fluorinated ketone. The term "ketone" is intended to denote a compound incorporating at least one carbonyl group with two carbon atoms attached to the carbon of the carbonyl group. It shall encompass saturated compounds and unsaturated compounds including double and/or triple bonds. The at least partially fluorinated alkyl chain of the ketones can be linear or branched. The term "ketone" shall also encompass compounds with a cyclic carbon backbone. The term "ketone" may comprise additional in-chain hetero-atoms, e.g. at least one heteroatom being part of the carbon backbone and/or being attached to the carbon backbone. More preferably, the at least one compound is a perfluorinated ketone. Examples of suitable perfluorinated ketones include 1,1,1,3,4,4,4-heptafluoro-3-(trifluoromethyl)-butan-2-one; 1,1,1,3,3,4,4,5,5,5-decafluoropentan-2-one; 1,1,1,2,2,4,4,5,5,5-decafluoropentan-3-one, 1,1,1,4,4,5,5,5,-octafluoro-3-bis-(trifluoromethyl)-pentan-2-one; and most preferably heptafluoroisopropyl-trifluoromethyl-ketone.

Also preferably, the at least one compound is a perfluorinated or partially fluorinated ether. The term "ether" is intended to denote a compound incorporating at least one "—C—O—C—" moiety. Especially suitable examples include pentafluoro-ethyl-methyl ether and 2,2,2-trifluoro-ethyl-trifluoromethyl ether.

Also preferably, the at least one compound is a perfluorinated or partially fluorinated ester, i.e. a compound incorporating at least one "—C(O)O—" moiety. Suitable compounds are known in the art, especially suitable examples include methyl, ethyl, and trifluoromethyl esters of trifluoroacetic acid.

Also preferably, the at least one compound is a different perfluorinated or partially fluorinated cyano compound, i.e. a compound incorporating at least one moiety of the structure "—C≡N". Preferably, this other cyano compound is perfluorinated, more preferably the cyano compound is chosen from the list consisting of perfluorinated methyl, ethyl, isopropyl, propyl, butyl, isobutyl and tertbutyl nitrile.

Also preferably, the at least one compound is a perfluorinated or partially fluorinated hydrocarbon compound. "Hydrocarbon compound" is intended to denote a saturated or unsaturated hydrocarbon, which may in addition to the fluoro substitution also be substituted by other halogen atoms, e.g. Cl, Br, and/or I. Suitable examples include $CHF_3$, $C_2F_4$, $CF_3CF_2CF_2CF_2I$, and $CF_2Cl_2$.

The term "electrical active part" has to be understood very broadly. Preferably, it covers any part which is used for the generation, the distribution or the usage of electrical energy provided it comprises a gas-tight housing wherein the dielectrically insulating medium provides for the dielectrically insulation of parts which bear voltage or current. Preferably, the electrical active parts are medium voltage or high voltage parts. The term "medium voltage" relates to a voltage in the range of 1 kV to 72 kV; the term "high voltage" refers to a voltage of more than 72 kV. While these are preferred electrical active parts in the frame of the present invention, the parts may also be low voltage parts with a voltage below 1 kV being concerned.

It has to be noted that the electrical active parts of the invention can be "stand alone" parts, or they can be part of an assembly of parts, e.g. of an apparatus. This will now be explained in detail.

The electrical active part can be a switch, for example, a fast acting earthing switch, a disconnector, a load-break switch or a puffer circuit breaker, in particular a medium-voltage circuit breaker (GIS-MV), a generator circuit breaker (GIS-HV), a high voltage circuit breaker, a bus bar a bushing, a gas-insulated cable, a gas-insulated transmission line, a cable joint, a current transformer, a voltage transformer or a surge arrester.

The electrical active part may also be part of an electrical rotating machine, a generator, a motor, a drive, a semiconducting device, a computing machine, a power electronics device or high frequency parts, for example, antennas or ignition coils.

The method of the invention is especially suited for medium voltage switchgears and high voltage switchgears.

The insulating medium used in the method of the invention is preferably in the gaseous state when used in the method of the invention. However, depending on the conditions, e.g. the temperature and the pressure, under which the method is performed, the insulating medium can also be, at least partially, in the liquid state.

In the electrical active part, the insulating medium is preferably at a pressure of equal to or greater than 0.1 bar (abs.). The insulating medium is preferably at a pressure equal to or lowers than 30 bar (abs). A preferred pressure range is from 1 to 20 bar (abs.).

The partial pressure of the compound of general structure (I) in the gaseous phase depends, i.a. upon its concentration in the insulating medium. If the dielectrically insulating medium consists of the compound of general structure (I) its partial pressure is equal to the total pressure and corresponds to the ranges given above. If the medium includes an inert gas, the partial pressure of the compound of general structure (I) is correspondingly lower. A partial pressure of the compound of general structure (I) which is equal to or lower than 10 bar (abs) is preferred.

It is also preferred that the compound or the mixture, respectively, is such that under the climate conditions or the temperature in the ambience of the electrical apparatus, under the pressure in the electrical part, essentially no condensation of the components in the dielectrically insulating medium occurs. The term "essentially no condensation" denotes that at most 5% by weight, preferably at most 2% by weight, of the dielectrically insulating medium condenses. For example, the amounts of compound of formula (I) the kind and amount of inert gas are selected such that the partial pressure of compound of formula (I) is lower than the pressure where condensation of compound of formula (I) is observed at −20° C.

In a second aspect, the present invention concerns a composition consisting of, consisting essentially of, or comprising at least one compound of general formula (I): $NC-C_nH_mF_{(2n)-m}-O-C_{n'}H_{m'}F_{(2n'+1)-m'}$, wherein n is 1, 2, 3, 4, or 5 and m is integer between 0 and 2n and wherein n' is 1, 2, 3, 4, or 5 and m' is integer between 0 and 2n'; and at least one further compound selected from the group consisting of an inert gas, a perfluorinated or partially fluorinated ketone, a perfluorinated or partially fluorinated ether, a perfluorinated or partially fluorinated ester, a perfluorinated or partially fluorinated cyano compound and a hydrocarbon compound.

Preferably, the composition consists of, consists essentially of, or comprises $CF_3-O-CF_2-CN$ and at least one compound selected from the group consisting of an inert gas, a perfluorinated or partially fluorinated ketone, a perfluorinated or partially fluorinated ether, a perfluorinated or partially fluorinated ester, a perfluorinated or partially fluorinated cyano compound and a hydrocarbon compound.

More preferably, the composition consists of, consists essentially of, or comprises $CF_3-O-CF_2-CN$ and at least one compound selected from the group consisting of air, synthetic air, an air component, $N_2$, $O_2$, $CO_2$, $N_2O$, He, Ne, Ar, Xe or $SF_6$; preferably consisting of, consisting essentially of, or comprising $CF_3$—O—$CF_2$—CN and $N_2$.

In a third object, the present invention concerns an apparatus for the generation, distribution and/or usage of electrical energy wherein the apparatus comprises an electrical active part arranged in a gas-tight housing and said gas-tight housing containing an insulating medium comprising, consisting essentially of, or consisting of at least one compound of general formula (I): NC—$C_nH_mF_{(2n)-m}$—O—$C_{n'}H_{m'}F_{(2n'-1)-m'}$, wherein n is 1, 2, 3, 4, or 5 and m is integer between 0 and 2n and wherein n' is 1, 2, 3, 4, or 5 and m' is integer between 0 and 2n'; or containing an insulating medium consisting of, consisting essentially of, or comprising the inventive composition as defined above. Preferably, the insulating medium consists of, consists essentially of, or comprises $CF_3$—O—$CF_2$—CN. Also preferably, the apparatus is a medium-voltage or high-voltage switchgear.

Another object of the present invention concerns the use of the compounds or the mixtures of this invention, as herein described, as dielectrically insulating medium or as constituent of a dielectrically insulating medium as well as their use as an dry etching agent, e.g. a chamber cleaning agent, specifically, for plasma-enhanced chamber cleaning as a replacement for $NF_3$.

Another object of the present invention is the use of the compounds of general formula (I) as replacements for fluorocarbons or hydrofluorocarbons as blowing agents in the manufacture of closed-cell polyurethane, phenolic and thermoplastic foams, as propellants in aerosols, as heat transfer media, as fire extinguishing agents, as power cycle working fluids such as for heat pumps, as inert media for polymerization reactions, as fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewellery or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

Should the disclosure of any patents, patent applications, and publications which are incorporated herein by reference conflict with the description of the present application to the extent that it may render a term unclear, the present description shall take precedence.

The following examples further explain the invention without intention to limit it.

EXAMPLES

Example 1a

Manufacture of $CF_3$—O—$CF_2CN$ $CF_3$—O—$CF_2$—CN is prepared according to Gubanov, V. A. et al., Zhurnal Obshchei Khimii, 1965, Vol. 35, No. 4, pp. 754-755.

Example 1b

Manufacture of the Compositions

As described in WO98/23363, a homogenous mixture consisting $CF_3$—O—$CF_2$—CN and $N_2$ in a volume ratio 1:4 is manufactured in an apparatus comprising a static mixer and a compressor.

Example 2

Provision of an Earth Cable Containing the Dielectrically Insulating Medium of Example 1

The composition of example 1b is directly fed into an earth cable for high voltage, until a total pressure of 10 bar (abs) is achieved in the cable.

Example 3

A Switchgear Containing $CF_3$—O—$CF_2$—CN and $N_2$ in a Volume Ratio 1:4

A switchgear is used which contains a switch surrounded by a gas-tight metal case. The composition of example 1b is passed into the gas tight metal case via a valve until a pressure of 18 bar (abs) is achieved.

The invention claimed is:

1. A method for dielectrically insulating an electrical active part, the method comprising the step of: arranging the electrical active part in a gas-tight housing comprising an insulating medium comprising a compound of general formula (I):

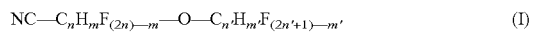

wherein n is 1, 3, 4, or 5 and m is integer between 0 and 2n and wherein n' is 1, 2, 3, 4, or 5 and m' is integer between 0 and 2n'.

2. The method according to claim 1, wherein n is 1.
3. The method according to claim 1, wherein n' is 1.
4. The method according to claim 1, wherein m is 0.
5. The method according to claim 1, wherein m' is 0.
6. The method according to claim 1, wherein the compound is $CF_3$—O—$CF_2$—CN.
7. A composition comprising at least one compound of general formula (I)

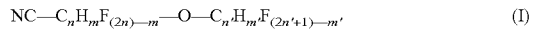

wherein n is 1, 3, 4, or 5 and m is integer between 0 and 2n and wherein n' is 1, 2, 3, 4, or 5 and m' is integer between 0 and 2n' and at least one further compound selected from the group consisting of an inert gas, a perfluorinated or partially fluorinated ketone, a perfluorinated or partially fluorinated ether, a perfluorinated or partially fluorinated ester, a perfluorinated or partially fluorinated cyano compound and a hydrocarbon compound.

8. The composition according to claim 7, comprising $CF_3$—O—$CF_2$—CN and at least one compound selected from the group consisting of an inert gas, a perfluorinated or partially fluorinated ketone, a perfluorinated or partially fluorinated ether, a perfluorinated or partially fluorinated ester, a perfluorinated or partially fluorinated cyano compound and a hydrocarbon compound.

9. The composition according to claim 8 comprising $CF_3$—O—$CF_2$—CN and the least one compound selected from the group consisting of air, synthetic air, $N_2$, $O_2$, $CO_2$, $N_2O$, He, Ne, Ar, Xe and $SF_6$.

10. The composition according to claim 9, comprising $CF_3$—O—$CF_2$—CN and $N_2$.

11. An apparatus for the generation, distribution and/or usage of electrical energy wherein the apparatus comprises an electrical active part arranged in a gas-tight housing, said gas-tight housing containing an insulating medium comprising at least one compound of general formula (I)

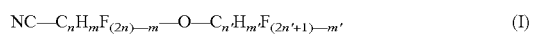

wherein n is 1, 3, 4, or 5 and m is integer between 0 and 2n and wherein n' is 1, 2, 3, 4, or 5 and m' is integer between 0 and 2n'; or containing an insulating medium comprising the composition according to claim 7.

12. The apparatus according to claim 11, wherein the insulating medium comprises $CF_3-O-CF_2-CN$.

13. The apparatus according to claim 11, wherein the apparatus is a medium-voltage or high-voltage switchgear.

* * * * *